No. 875,210. PATENTED DEC. 31, 1907.
J. J. RAVAILLIER.
CANOE CARRIAGE.
APPLICATION FILED JAN. 28, 1907.
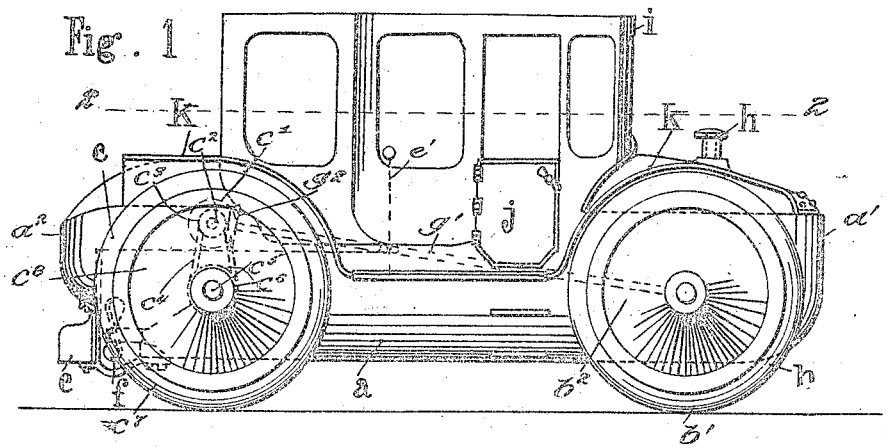
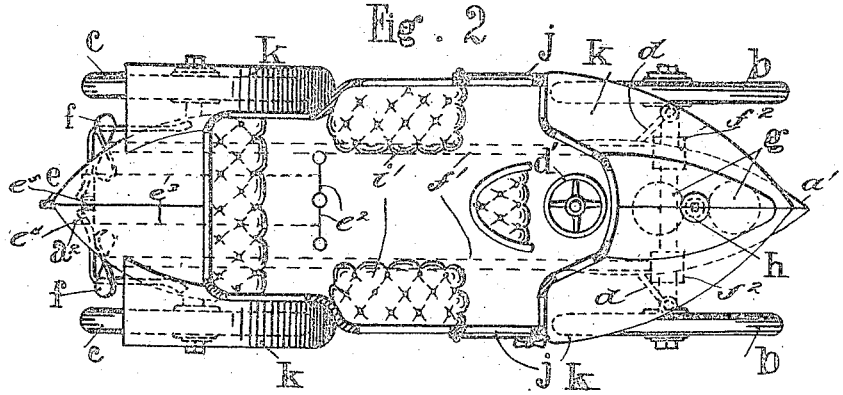
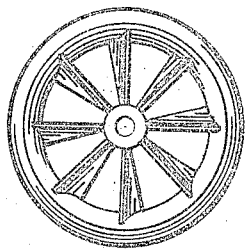

UNITED STATES PATENT OFFICE.

JULES JULIEN RAVAILLIER, OF PARIS, FRANCE.

CANOE-CARRIAGE.

No. 875,210.

Specification of Letters Patent.

Patented Dec. 31, 1907.

Application filed January 28, 1907. Serial No. 354,543.

*To all whom it may concern:*

Be it known that I, JULES JULIEN RAVAILLIER, a citizen of the Republic of France, and resident of 216 Boulevard Raspail, Paris, Seine, France, have invented an Improvement in Canoe-Carriages, of which the following is a specification.

This invention relates to improvements in motor vehicles and has for its object the construction of a vehicle adapted to be propelled on land and also adapted to navigate in water.

The invention comprises generally a vehicle body having a lower or base portion in the form of a boat and supporting wheels provided with tread portions adapted to propel the vehicle upon solid surfaces and having propelling means for navigating the vehicle in water. The forward wheels are connected with suitable steering apparatus for guiding the vehicle on land and said wheels are also adapted for guiding the vehicle in water and suitable motive power is provided in the vehicle for driving said wheels.

The invention also includes the provision of screw propellers connected with the motive power and adapted for use in lieu of the supporting wheels when the vehicle is being navigated in water together with a suitably disposed rudder adapted if desired to act conjointly with said screw propellers.

In cases where the river or lake bottom adjacent the shore line is soft and wherein difficulty would be encountered in landing the vehicle by relying upon the supporting wheels improved means are provided for cooperating with a rope or the like attached to some stationary or fixed part on land wheresoby the vehicle may act in conjunction with a rope or the like to pull itself upon land.

The invention will be more fully described in connection with the accompanying drawing and will be more particularly pointed out and ascertained in and by the appended claims.

In the drawing:—Figure 1 is a side elevation of a motor vehicle embodying the main features of my invention. Fig. 2 is a sectional view on line 2—2 of Fig. 1. Fig. 3 is a detail view of a combined supporting and propelling wheel adapted for use in connection with the improved vehicle.

Like characters of reference designate similar parts throughout the different figures of the drawing.

As shown the vehicle body is provided with a suitable upper portion $i$ adapted to receive the occupants and provided for this purpose with doors $j$ and seats $i'$. Said body is provided with a lower or base portion $a$ in the form of a boat having the usual stem $a'$ and stern $a^2$. Said vehicle is provided with wheels $b$ and $c$ the former being connected with suitable steering apparatus $d$ operated from a hand wheel $d'$ in the interior of the vehicle body. A motor $g$ is provided in the forward portion of the vehicle body and is suitably connected with the front wheels $b$ for the purpose of driving the same. Shafts $g'$ are operatively connected with the motor at the forward end of the vehicle and are suitably connected at their rear ends for the purpose of driving wheels $c$. As shown the shaft $g'$ is provided with a miter $g^2$ adapted to mesh with a miter $c'$ mounted on shaft $c^2$. Said shaft also carries a sprocket wheel $c^3$ about which sprocket chain $c^4$ is trained. The rear axle $c^5$ carries a sprocket wheel $c^6$ about which the chain $c^4$ is also trained. Each of the wheels $b$ and $c$ is provided with a tread portion $b'$ and $c^7$ respectively adapted to engage solid roadways and propel the vehicle thereon and the spokes of the rear wheels are preferably in the form of angular blades $c^8$ tapering from the rim toward the axle, and angularly disposed with reference to the rear axle, as shown best in Fig. 3. The front wheels are preferably solid, as shown at $b^2$.

In case of accident or other causes disabling the wheels $b$ and $c$ I preferably provide auxiliary navigating devices and a steering device which may however be used in conjunction with the wheels $b$ and $c$. As shown said auxiliary devices consist of screw propellers $f$ located at the rear of the vehicle body and mounted on propeller shafts $f'$ which extend forwardly in the base portion of the vehicle where they are connected at $f^2$ in any desired manner to the source of power. As shown two propellers are provided and while the vehicle is being navigated in water it may be guided by manipulating the propellers $f$ in the well known manner i. e., by operating one and reversing the other or leaving one in a position of rest. In order however to more fully equip the vehicle for active and efficient service I provide the same with a rudder $e$ adapted for use in connection with the propellers $f$ or in an auxiliary capacity with respect to the wheels $b$. A steering rod $e'$ projecting into the upper portion of the vehicle is provided with handles $e^2$ and is connected at its lower end by means of cables $e^3$ with arms $e^4$ fixed to the rudder shaft $e^5$.

A windlass $h$ is located at the forward end of the vehicle and is operatively related in any desirable manner to the motor $g$. When the vehicle is approaching the shore line from the water and the bottom of the lake or river is soft so that the wheels cannot be relied upon to propel the vehicle onto the land a rope or the like may be secured to any fixed part on land and wound about the windlass $h$. The windlass $h$ may then be thrown into operative relation with the motor to propel the vehicle onto land.

I claim:—

1. In a combined motor vehicle and boat, the combination of a boat body provided with solid front wheels and propelling rear wheels having tapering angularly-disposed blades $c^8$, a pair of screw propellers $f$ attached to said body, a rudder between the same, a motor, and connections between the motor and said front wheels said rear wheels and said propellers, substantially as described.

2. In a combined motor vehicle and boat, the combination of a vehicle body $i$, having the doors $j$ and seats $i'$, of a boat body having the solid front wheels $b$, the propelling rear wheels $c$, provided with the tapering and angularly-disposed blades $c^3$, the pair of propellers $f$, the rudder $e$ between the same, the motor $g$, driving connections between the motor and said front wheels, the driving shaft $g'$, bevel gearing $g^2$, $c'$, and sprocket connections $c^4$, $c^6$ connecting said motor to the rear wheels, and additional independent connections between said motor and the said propellers, substantially as described.

3. In a combined motor vehicle and boat, the combination of a vehicle body $i$, having the doors $j$, and seats $i'$, of a boat body having the solid front wheels $b$, the propelling rear wheels $c$, provided with the tapering and angularly-disposed blades $c^8$, the pair of propellers $f$, the rudder $e$ between the same, the motor $g$, driving connections between the motor and said front wheels, the driving shaft $g'$, bevel gearing $g^2$, $c'$, and sprocket connections $c^4$, $c^6$ connecting said motor to the rear wheels, and additional independent connections between said motor and the said propellers consisting of the shafts $f'$ and the connections $f^2$, substantially as described.

4. In a combined motor vehicle and boat the combination of a boat body provided with solid front wheels and propelling rear wheels having tapering angularly-disposed blades $c^8$, a pair of screw propellers $f$ attached to said body, a rudder between the same, a motor, a windlass $h$, connections between the same and said motor, and connections between the motor and said front wheels said rear wheels and said propellers, substantially as described.

5. In a combined motor vehicle and boat, the combination of a vehicle body $i$ having the doors $j$, and seats $i'$, of a boat body having the solid front wheels $b$, the propelling rear wheels $c$, provided with the tapering and angularly-disposed blades $c^8$, the pair of propellers $f$, the rudder $e$ between the same, the motor $g$, a windlass $h$, connections between the same and said motor, driving connections between the motor and said front wheels, the driving shaft $g'$, bevel gearing $g^2$, $c'$ and sprocket connections $c^4$, $c^6$ connecting said motor to the rear wheels, and additional independent connections between said motor and the said propellers, substantially as described.

6. In a combined motor vehicle and boat, the combination of a vehicle body, a boat body, a motor, solid front and propelling rear wheels provided with treads adapted to travel on land, a windlass $h$, connections between the same and said motor, a shaft $g'$ connected to said motor, gearing between said shaft and the rear wheels, a pair of propellers $f$, shafts $f'$ connecting said motor and said propellers, a rudder $e$, a handle $e^2$ located in said vehicle body, and connections between said handle and said rudder, substantially as described.

In testimony whereof I affix my signature in presence of two witnesses.

JULES JULIEN RAVAILLIER.

Witnesses:
  H. C. COXE,
  VICTOR NATRAY.